W. W. BEALL.
STRAINER.
APPLICATION FILED MAR. 13, 1920.
1,345,342.
Patented July 6, 1920.
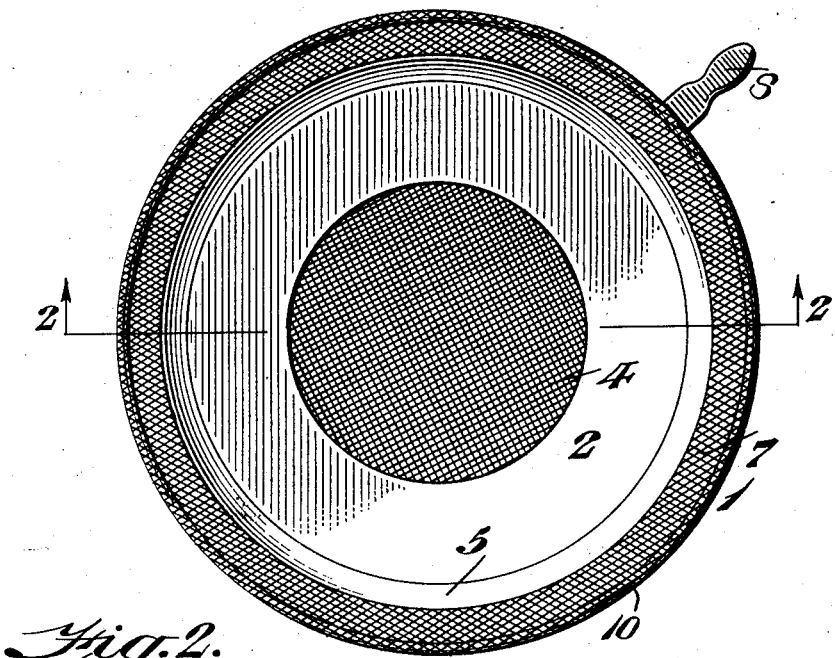
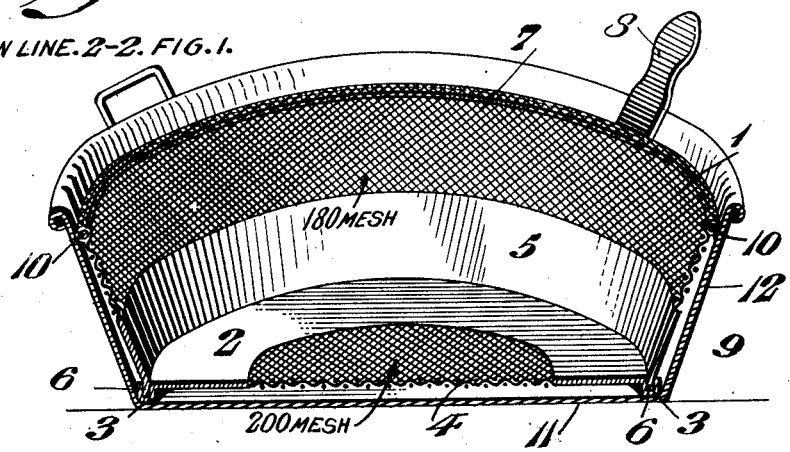
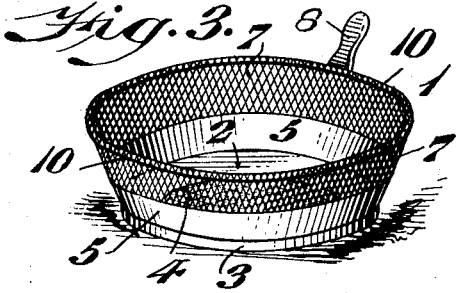
INVENTOR
Walter W. Beall.
BY
ATTORNEYS

UNITED STATES PATENT OFFICE.

WALTER W. BEALL, OF PHILADELPHIA, PENNSYLVANIA.

STRAINER.

1,345,342.   Specification of Letters Patent.   Patented July 6, 1920.

Application filed March 13, 1920. Serial No. 365,437.

*To all whom it may concern:*

Be it known that I, WALTER WARING BEALL, a citizen of the United States, residing in the city and county of Philadelphia, State of Pennsylvania, have invented a new and useful Strainer, of which the following is a specification.

My invention consists of a novel construction of a strainer, which is adapted for the frying or cooking of breaded chops, clams, soft shell crabs or any other desired edibles in heated fat or other liquid at an even temperature, my novel strainer being so constructed that its bottom is always away from or above the bottom of the exterior or surrounding fat pot, means being provided by the provision of a central bottom straining disk of comparatively fine mesh and an upper annular ring of coarser mesh for permitting the proper circulation of the heated fat or other liquid contained in the fat pot in which my device is inserted.

To the above ends, my invention consists of a novel construction of a strainer, having in its bottom a central disk of comparatively fine wire mesh, around which is a solid annular ring, above which projects an upwardly diverging solid ring, the solid or impervious portion of the strainer being connected in such a manner that the bottom of my device is elevated from the bottom of the fat pot, and thereby prevented from burning, the upper outer portion of the strainer being provided with an annular ring of a mesh coarser than the central disk of fine mesh at the bottom of the strainer.

For the purpose of illustrating my invention, I have shown in the accompanying drawings one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a strainer embodying my invention.

Fig. 2 represents a section on line 2—2 of Fig. 1.

Fig. 3 represents on a reduced scale a perspective view of the strainer.

Similar numerals of reference represent corresponding parts in the drawings.

Referring to the drawings:—

In carrying out my invention, I provide my novel construction of strainer 1 with a bottom 2, whose outer portion is in the shape of a solid or impervious annular ring, having the outer peripheral groove 3, said bottom 2 being raised above the bottom of the metal out of which said groove 3 is formed, as will be understood from Fig. 2. The central portion of the bottom is provided with a disk like portion 4 of comparatively fine mesh, as the two hundred mesh of commerce, and from the bottom or outer annular solid ring 2 extends upwardly the solid ring 5, whose walls diverge outwardly, the bottom terminal 6 of said solid side ring 5 being seated in the annular groove 3, as will be understood from Fig. 2.

The upper portion of the strainer consists of an upper annular ring 7, of coarser mesh, as 180 mesh, whose walls diverge outwardly and upwardly, and whose upper edge is reinforced by the annular wire 10 as will be understood from Fig. 2, and the device is provided with a handle 8 for convenient manipulation.

9 designates a fat pot inclosing the strainer, whose construction will be apparent from Fig. 2, said fat pot having the bottom 11 and side wall 12.

Upon the bottom 2 are placed the edibles to be cooked as breaded chops, clams, oysters, soft shell crabs, or the like, which have been breaded with bread-crumbs or with batter. The strainer is then placed in the fat pot 9, which has been filled with heated fat of sufficient quantity to cover said edibles and the fat pot is placed upon the fire.

Impurities in the heated fat or other liquid used as the violent boiling ensues tend to pass upward, but are prevented from coming in contact with the food being cooked by the solid annular wall 5. Meanwhile the food during cooking is contained upon the bottom 2 and is slowly cooked or fried in an even temperature, being thoroughly and evenly fried or cooked. The crumbs or batter with which the edibles are breaded would in an ordinary kettle be in part removed by the action of boiling fat or other liquid and, passing to the bottom of the kettle, would some of them become blackened and burned, and some would stick to the bottom of the kettle and be removed by a stirring of the heated fat or by the action of the fat in boiling. The heated fat or other liquid would thus become discolored and blackened and would in turn discolor and blacken the food being fried or cooked and make it unpleasant to the eye and unpalatable to the taste. By my invention no crumbs or batter can fall through the fine mesh surfaces 4 of the bottom of my novel strainer while the evenly-cooked food product is handsomely browned and most appetizing, as well as palatable. The heated fat or other liquid may be immediately drained off while it is hot from the fried food in order that as little grease as possible may be on the food product, which can be readily done upon lifting the strainer out of the fat pot, whereupon said fat will drain through the central mesh 4, back into the fat pot, so that there will be no waste, as is evident.

Especial attention is also called to the feature of construction whereby the bottom 2, comprising the solid outer ring and the central mesh 4 is at all times elevated above the bottom of the fat pot so that there is at all times a sufficient circulation of the fat in the fat pot, and in addition there is no danger of the bottom 2 being burned.

It will now be apparent that I have devised a novel and useful construction of a strainer which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent is:—

1. In a device of the character stated, a strainer, having a raised bottom provided with an outer annular solid ring and an inner disk of fine mesh, and an annular solid wall projecting from said solid bottom ring and terminating in an annular upper mesh wall.

2. A strainer comprising a bottom having an outer annular solid horizontal portion and a central disk portion of mesh, said outer portion terminating in an annular peripheral trough shaped ring, and a solid side wall having its lower edge seated in said trough shaped ring and terminating in an upper annular wall of coarser mesh, said bottom being raised above the bottom of said trough shaped ring.

WALTER W. BEALL.

Witnesses:
E. HAYWARD FAIRBANKS,
C. D. McVAY.